US012613942B2

(12) United States Patent
Mussallem et al.

(10) Patent No.: US 12,613,942 B2
(45) Date of Patent: Apr. 28, 2026

(54) MANAGE TRAINING DATA IN ARTIFICIAL INTELLIGENCE

(71) Applicant: Ava Labs, Inc., New York, NY (US)

(72) Inventors: Nicholas John Mussallem, San Rafael, CA (US); Emin Gün Sirer, Ithaca, NY (US); Nicholas Stamm, New York, NY (US)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 18/796,394

(22) Filed: Aug. 7, 2024

(65) Prior Publication Data

US 2025/0053622 A1      Feb. 13, 2025

Related U.S. Application Data

(60) Provisional application No. 63/531,803, filed on Aug. 9, 2023.

(51) Int. Cl.
*G06F 21/10*          (2013.01)
*G06N 20/00*          (2019.01)

(52) U.S. Cl.
CPC ......... *G06F 21/1014* (2023.08); *G06N 20/00* (2019.01)

(58) Field of Classification Search
CPC .......................... G06F 21/1014; G06N 20/00
See application file for complete search history.

(56) References Cited

U.S. PATENT DOCUMENTS 11,244,032 B1      2/2022  Nguyen
11,983,655 B2      5/2024  Diedrich et al.

2019/0122258 A1      4/2019  Bramberger et al.
2019/0287026 A1      9/2019  Calmon et al.
(Continued)

FOREIGN PATENT DOCUMENTS

CN      116383776  A      7/2023
CN      117407493  A      1/2024
(Continued)

OTHER PUBLICATIONS

International Search Report and Written Opinion for International Patent App. No. PCT/US2024/041283, mailed Oct. 16, 2024 (15 pages).

*Primary Examiner* — John W Hayes
*Assistant Examiner* — Zehra Raza
(74) *Attorney, Agent, or Firm* — McDermott Will & Schulte LLP

(57) ABSTRACT

Various aspects of the subject technology relate to systems, methods, and machine-readable media for managing training data in artificial intelligence (AI) models. Various aspects may include receiving, at a blockchain, training data from data sources. Aspects may also include validating authenticity of the data sources. Aspects may also include receiving a request for training AI models using the training data and training the models based on an approval of the request. Aspects may also include submitting a first transaction to the blockchain for the training of the models using the training data. Aspects may also include generating a response to a query from a user using the models based on at least a subset of the training data. Aspects may also include submitting a second transaction to the blockchain for leveraging the subset of the training data to generate the response to the query.

21 Claims, 5 Drawing Sheets

(56) References Cited

U.S. PATENT DOCUMENTS

| 2020/0143267 | A1* | 5/2020 | Gidney ................. H04L 9/3239 |
| 2020/0311553 | A1* | 10/2020 | Keski-Valkama ... G06Q 10/101 |
| 2020/0394470 | A1 | 12/2020 | Ganapavarapu et al. |
| 2022/0138550 | A1* | 5/2022 | Zhang ................... G06N 3/063 |
| | | | 706/25 |
| 2022/0292202 | A1* | 9/2022 | Manevich .............. G06F 21/53 |
| 2022/0309489 | A1 | 9/2022 | Kahn et al. |
| 2024/0281504 | A1* | 8/2024 | Collomosse ......... H04L 9/3213 |

FOREIGN PATENT DOCUMENTS

| CN | 117556387 | A | 2/2024 |
| CN | 111143375 | B | 3/2024 |

* cited by examiner

300

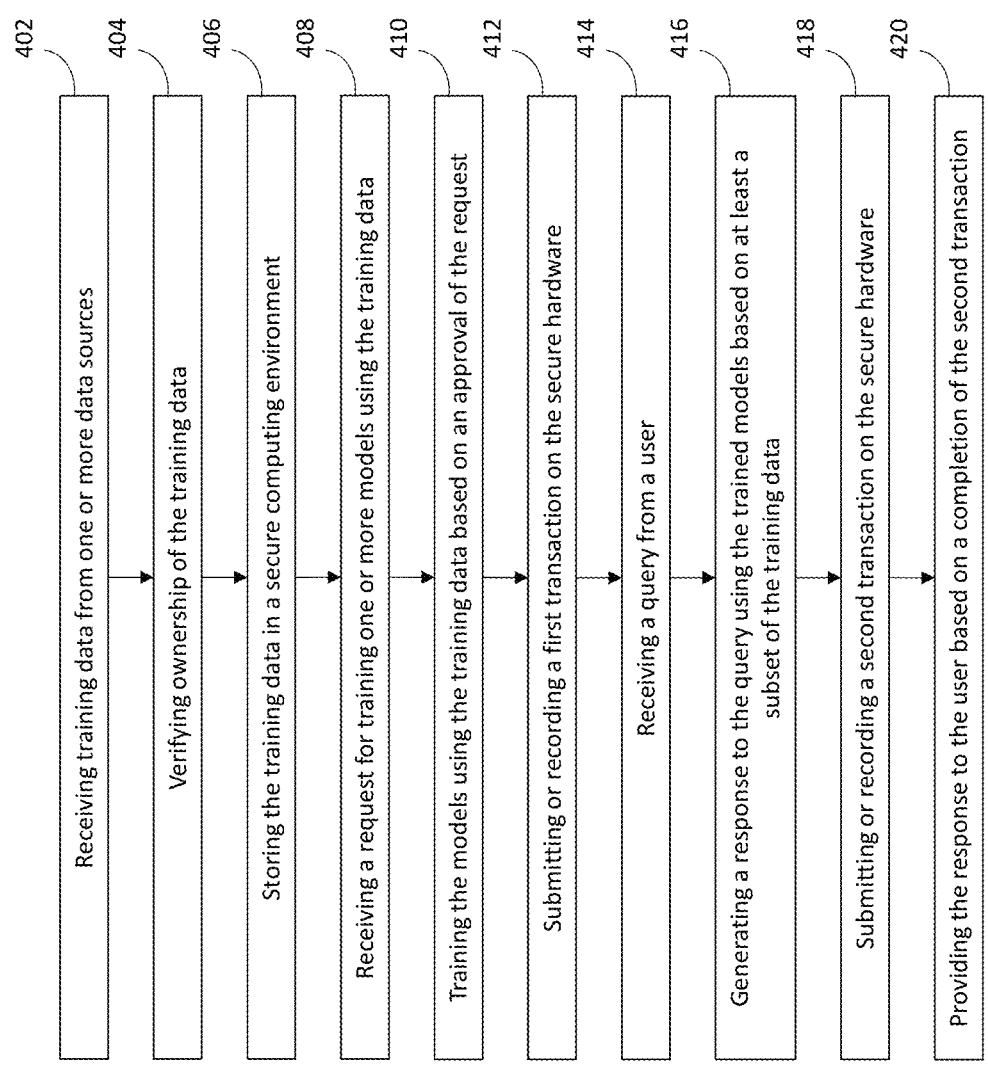

402 — Receiving training data from one or more data sources

404 — Verifying ownership of the training data

406 — Storing the training data in a secure computing environment

408 — Receiving a request for training one or more models using the training data 410 — Training the models using the training data based on an approval of the request 412 — Submitting or recording a first transaction on the secure hardware 414 — Receiving a query from a user 416 — Generating a response to the query using the trained models based on at least a subset of the training data 418 — Submitting or recording a second transaction on the secure hardware 420 — Providing the response to the user based on a completion of the second transaction

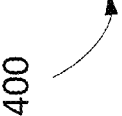

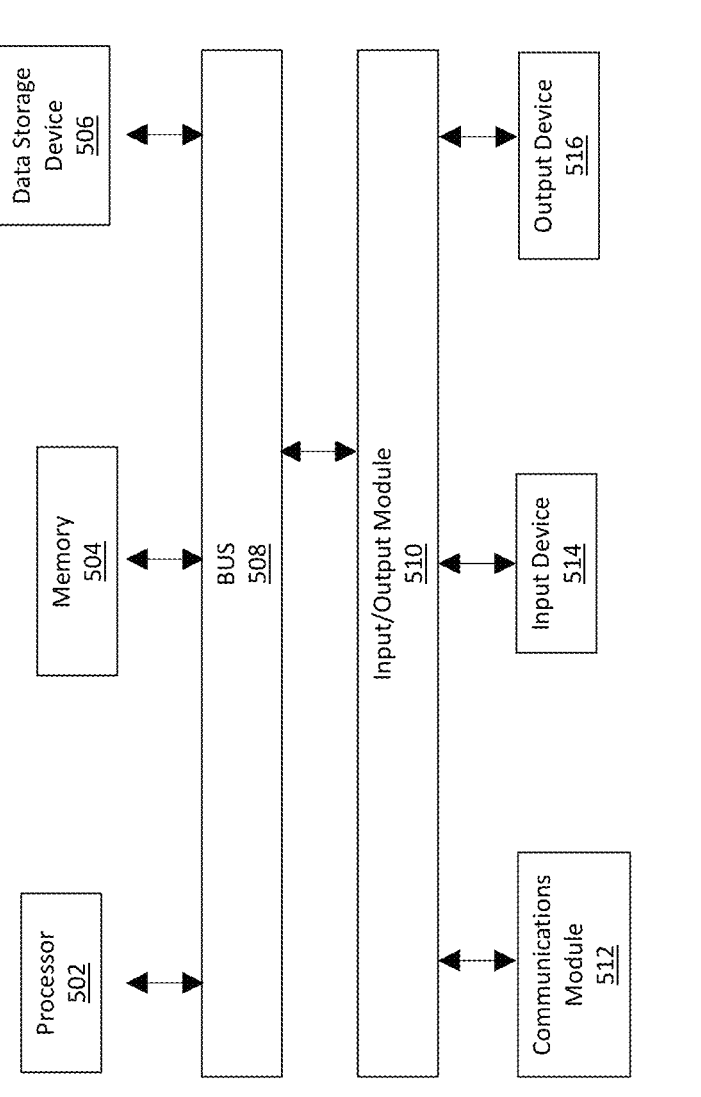
FIG. 5

MANAGE TRAINING DATA IN ARTIFICIAL INTELLIGENCE

CROSS-REFERENCE TO RELATED APPLICATIONS

The present disclosure is related and claims priority, under 35 U.S.C. § 119(e), to U.S. Provisional Patent Application No. 63/531,803, entitled USING BLOCKCHAIN FOR TRAINING DATA IN ARTIFICIAL INTELLIGENCE MODELS, to Emin Gün Sirer, filed on Aug. 9, 2023, the contents of which are hereby incorporated by reference in their entirety, for all purposes.

TECHNICAL FIELD

The present disclosure generally relates to blockchain technology, and more specifically relates to utilizing blockchains to identify and record copyrighted data collected for use in generative artificial intelligence (AI).

BACKGROUND

Artificial Intelligence (AI) has captured the world's imagination by rapidly creating novel images, text, music and more with minimal effort. It allows writers, artists and other content creators to quickly develop new material without having to manually create each element. AI models and software may be trained on large volumes of data to allow the model to learn and continuously make improved predictions, patterns, or classify data to generate outputs for a respective implementation of the model. Thus, with the use of large amounts of data introduces risk of copyright infringement.

BRIEF SUMMARY

The subject disclosure provides for systems and methods for managing copyright risk in training AI applications. According to embodiments, a computer-implemented method for managing the training data using, for example, blockchain technology, is provided. The method includes receiving, at a blockchain, training data from one or more data sources. The method also includes receiving a request for training one or more models using the training data. The method also includes training the models using the training data based on an approval of the request. The method also includes submitting a first transaction to the blockchain for the training of the models using the training data. The method also includes generating a response to a query from a user using the models based on at least a subset of the training data. The method also includes submitting a second transaction to the blockchain for leveraging the subset of the training data to generate the response to the query.

According to embodiments, a system is provided including a processor and a memory comprising instructions stored thereon, which when executed by the processor, cause the processor to perform a method for managing training data. The method includes receiving, at a blockchain, training data from one or more data sources. The method also includes receiving a request for training one or more models using the training data. The method also includes training the models using the training data based on an approval of the request. The method also includes submitting a first transaction to the blockchain for the training of the models using the training data. The method also includes generating a response to a query from a user using the models based on at least a subset of the training data. The method also includes submitting a second transaction to the blockchain for leveraging the subset of the training data to generate the response to the query.

According to embodiments, a non-transitory computer-readable storage medium is provided including instructions (e.g., stored sequences of instructions) that, when executed by a processor, cause the processor to perform a method for managing training data. The method includes receiving, at a blockchain, training data from one or more data sources. The method also includes receiving a request for training one or more models using the training data. The method also includes training the models using the training data based on an approval of the request. The method also includes submitting a first transaction to the blockchain for the training of the models using the training data. The method also includes generating a response to a query from a user using the models based on at least a subset of the training data. The method also includes submitting a second transaction to the blockchain for leveraging the subset of the training data to generate the response to the query. The method also includes providing the response to the user based on a completion of the second transaction, wherein submitting the second transaction to the blockchain triggers residual payments from an account associated with the models to each owner corresponding to the subset of the training data.

These and other embodiments will become clear to one of ordinary skill in the art, in view of the following.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is an example flow diagram, according to certain aspects of the present disclosure.

FIG. 5 is a block diagram illustrating an example computer system with which aspects of the subject technology can be implemented.

Figure 1:
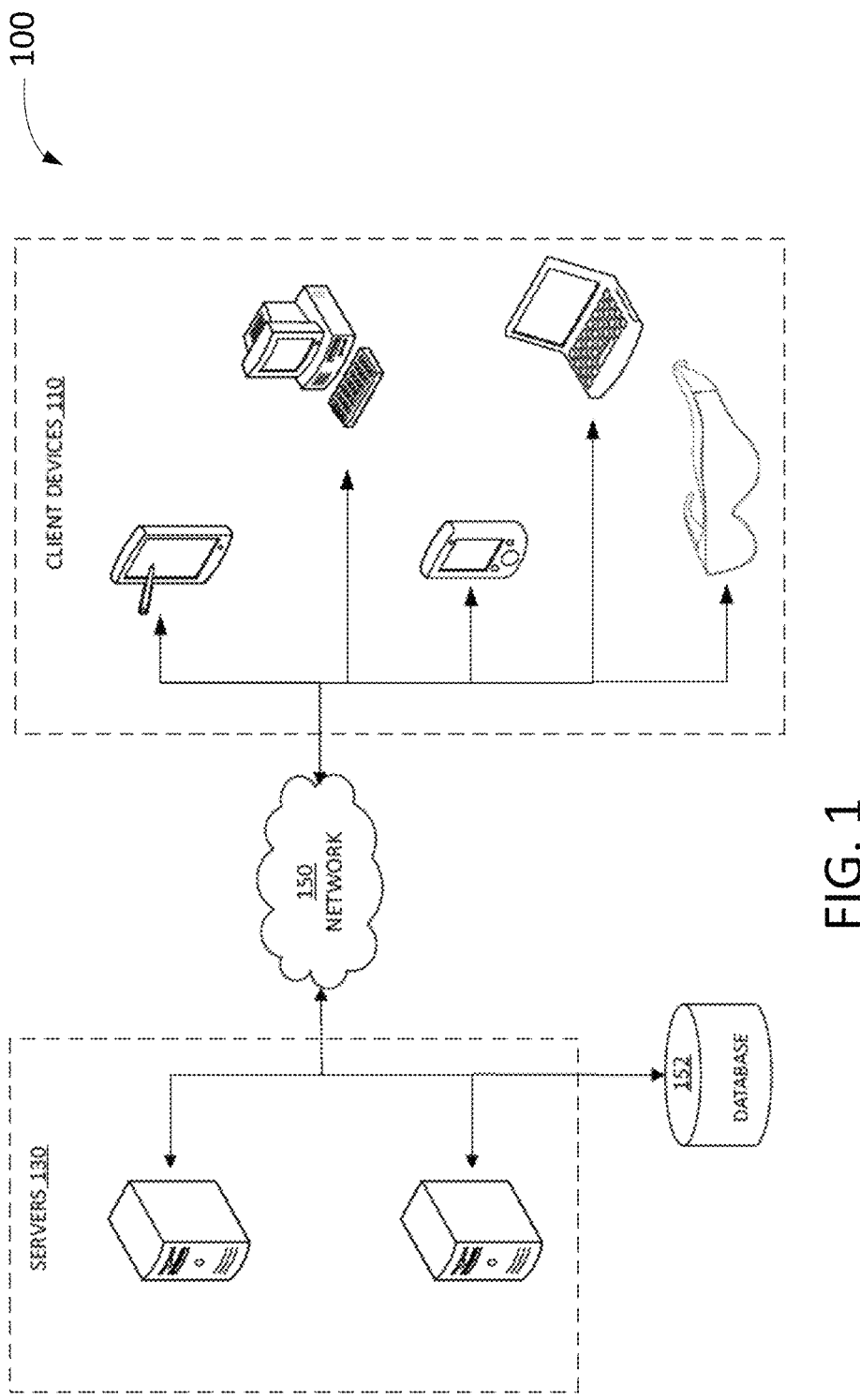
FIG. 1 illustrates an exemplary network architecture in which methods and systems may be implemented, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

Artificial Intelligence (AI) has captured the world's imagination by rapidly creating novel images, text, music and more with minimal effort. It allows writers, artists and other content creators to quickly develop new material without having to manually create each element. AI models and software may be trained on large volumes of data which allow the model to learn and continuously make improved predictions, patterns, or classify data to generate outputs for a respective implementation of the model. AI relies heavily on large language models (LLMs), which utilize large amounts of data from varying sources (e.g., the internet, other training models, sensor data, etc.). Due to the large amounts of data drawn for use in AI, some of the data may be copyrighted or otherwise protected by law and the creators of the original content are rarely paid when LLMs utilize their work. The issue of LLM copyright infringement will only proliferate as generative AI usage grows. As such, there is a need for systems and methods that securely grow generative AI and the possibilities for LLMs.

The subject disclosure overcomes the above-described issue by providing for systems and methods that help copyright enforcement in AI implementations. According to embodiments, data (e.g., created content), ownership, and/or the use of the data as training data in, for example, AI models (e.g., LLMs) are tracked and recorded. The record may be verified as authentic and used to enforce and maintain rights of creators associated with the data being used in AI training or otherwise.

Aspects of embodiments may include processors as coordinators for other processing units to certify data and maintain records for training AI models and usage of the trained AI models. Embodiments may implement blockchain technology to identify and record the provenance of copyrighted data collected by AI models so that appropriate steps can be taken, for example, either for distributing proper compensation to the creators or to avoid lawsuits. System and methods of embodiments establish a marriage of blockchain and AI to create better outcomes for businesses, their many users, and content creators alike while improving the commercial and regulatory challenges of AI.

According to some embodiments, secure computing methods may be used to record a resulting matrix of weights in a neural network, along with a full record of data used to reach the resulting matrix. A certificate may be created to indicate a matrix is computed using a back propagation routine operating with a set of inputs computed on trusted execution environments built into a secure hardware (e.g., a secure chip, CPU) using a set of instruction codes (e.g., Software Guard Extensions (SGX)). The certificate serves as an immutable certification that a specific processor running a set of instruction codes produced a given matrix by taking a specified set of inputs. The secure hardware may be used in a configuration where the secure hardware is performing the computation (i.e., for training the AI model) and feeds one or more GPUs the data record and the resulting matrix. The GPUs are configured to generate the certificate based on the record of inputs fed to the secure hardware to arrive at the resulting matrix. In some implementations, the certificate may be generated by a highly optimized processor, computing unit, or other processing unit.

According to some embodiments, the certificate may be generated by the secure hardware. The secure hardware or element may be on a graphics chip (e.g., GPU) performing the training of the AI model as well as generating the certificate based on the computations performed to train the AI model. Therefore, the training inputs are indisputable and inherently verified as the computation/back propagation and certification is performed by the same processing entity which can attest to the set of inputs used to produce a given output/matrix.

According to embodiments, content creators/owners of copyrighted data and their content may be maintained on blockchains. Blockchain technology includes a growing list of records, called blocks, that are linked together using cryptography. Each block contains a cryptographic hash of the previous block, a timestamp, and transaction data, which generally is represented as a Merkle tree. The timestamp proves that the transaction data existed when the block was published to get into its hash. As blocks each contain information about the block previous to it, they form a chain, with each additional block reinforcing the ones before it. Therefore, blockchains are resistant to modification of their data because once recorded, the data in any given block cannot be altered retroactively without altering all subsequent blocks. As a distributed ledger technology, blockchain allows users to store and track digital transactions securely on a decentralized network without any centralized control or authority.

Blockchain also provides an immutable record of transactions, meaning all information about who created what and when can be stored on the digital ledger. As such, data from the AI models may be put on-chain, maintaining information associated with the data and tracking use of copyright information in the blockchain. In this manner, embodiments provide a synergistic relationship between generative AI and blockchain technology. This also provides transparency into an AI model's use of copyrighted material, and similarly material that has not been copyrighted, ensuring protection for creators.

Accordingly, data and associated data ownership are stored on the blockchain. AI models can request certain data to use for training. These requests are verified and tracked on the blockchain. By training using blockchain techniques, inputs used to generate or train an AI model may be maintained on the blockchain. This provides an auditable training system that can be verified. For example, a user can easily prove that a trained model was computed independently from a given piece of data based on the record in the blockchain corresponding to the trained model.

According to some embodiments, the use of the trained models may also be recorded on the blockchain. For example, an AI model requests the use of data X, with a first user verified as the owner, for training the AI model. Data X is used to generate a trained AI model. Any use implementation, or deployment of the trained AI model, for example, for an application or the like may be tracked on the blockchain.

According to aspects of embodiments, the blockchain represents a ledger tracking the use of copyrighted data in training data as well as compensation for the use of the copyrighted data. When the verified data is utilized for training the AI model(s) or leveraged by the AI model(s) to produce an output, for example, to a consumer or another model, the creators are compensated for usage of their copyrighted data. Transactions to compensate creators for the use of their data are finalized on the blockchain. Blockchain networks can be programmed so that each use (i.e., transaction) requires a payment, allowing creators to automatically receive payments whenever their content is used by AI models. By leveraging blockchain in this way, companies building AI models, LLMs, or other machine learning (ML) models are able to avoid costly lawsuits while still innovating and building models that can tap into generative AI's potential.

In some embodiments, the blockchain is used to maintain and deploy a payment system. By non-limiting example, the payment system may be based on one or more of the data, context, creator information, copyright laws, jurisdiction/ location, etc. The payment system may be enforced for each transaction or block in the blockchain. In some embodiments, each input has a corresponding owner defined as an address on the blockchain. Every use of the matrix may initiate a transaction to compensate the owner based on the address. By non-limiting example, an original creator may contribute to the training of an LLM which is recorded on the blockchain. A token of the blockchain may be transferred to the original creator for their contribution in training the LLM. In some implementations, users of the LLM may be required to pay a fee for using the LLM and the original content creator may receive compensation for the usage of their content.

The disclosed system addresses a problem in generative AI tied to computer technology, namely, the technical problem of managing and tracking copyright information for data being used in AI/LLMs. The disclosed system solves this technical problem by providing a solution also rooted in computer technology, namely, by providing for systems and methods for generating a certified and secure record using secure computing elements or customized blockchains to identify and record the provenance of copyrighted data collected by AI models for training, as well as the use of the trained models. The disclosed system also enables increased protection for content creators as well as avoiding copyright infringement and lawsuits as large language models develop over time.

Example Architecture

FIG. 1 illustrates an exemplary network architecture 100 in which methods, apparatuses, and systems described herein may be implemented. Network architecture 100 may include servers 130 and a database 152, communicatively coupled with multiple client devices 110 via a network 150. In some implementations, the network architecture 100 can be for a blockchain network comprising distributed databases that maintains a continuously growing list of ordered records as the blocks. Any one of the servers 130 may host a blockchain platform on the network.

The servers 130 may include a cloud server or a group of cloud servers. In some implementations, the servers 130 may not be cloud-based servers (i.e., may be implemented outside of a cloud computing environment) or may be partially cloud-based. The servers 130 may send messages or issue transactions upon request by the client devices 110. The messages may be validated by a validator of the blockchain network.

Client devices 110 may include any one of a laptop computer, a desktop computer, or a mobile device such as a smart phone, a palm device, or a tablet device. As an example, the client devices 110 may be clients of the blockchain platform for creating, expanding, or otherwise modifying customized blockchain networks and/or private or public subnets. AI model training requests may be submitted at the client devices 110 and processed at the servers

130. One or more of the client devices 110 and servers 130 may function as nodes that run software to verify block and transaction data, store data, validate, respond to network requests for data, and/or the like for existing blockchains. By non-limiting example, the client devices 110 can be controlled by users as a set of validator nodes for making decisions in tandem, such as for facilitating operation or design of the blockchain implementations of the blockchain platform.

The network 150 may include a wired network (e.g., via fiber optic or copper wire, telephone lines, and the like) or wireless network (e.g., a cellular network, radio-frequency (RF) network, Wi-Fi, Bluetooth, and the like). The participants 110 may be any one of a mobile device, a laptop, a desktop, a tablet (e.g., palm or pad) device, a television, a display device, and/or the like. The network 150 may provide one or more client devices 110 access to the blockchain platform hosted by the participants 130 via an online or offline connection, such as a wireless connection, wired connection, ad hoc connection, mobile connection, satellite connection, and/or the like. Each of the participants 130 may be a computing device such as part of a cloud computing server including one or more desktop computers or panels mounted on racks, and/or the like. The panels may include processing boards and also switchboards, routers, and other network devices.

Database 152 may store backup files from the lead processing, instructions, metadata, or the like. In some embodiments, the servers 130 may store data of the existing blockchain in a peer-to-peer (P2P) and/or distributed ledger fashion in database 152. The database 152 may store relevant information regarding, for example, execution, and verification logic and/or rules for implementing record tracking, etc. In particular, the servers 130 may function in conjunction to autonomously manage the decentralized database(s) of the existing blockchain via the P2P network and a distributed timestamping server of the servers 130. The servers 130 may be configured to implement multiple chains of the blockchain network. For example, the servers 130 can implement a plurality of chains of the network architecture 100, such as an asset blockchain (e.g., for creating new assets, asset exchange, cross-subnet transfers), metadata blockchain (e.g., for coordinating validators, tracking active subnets, and creating new subnets), smart contract blockchain (e.g., for creating smart contracts and applications that require total ordering), etc.

Figure 2:
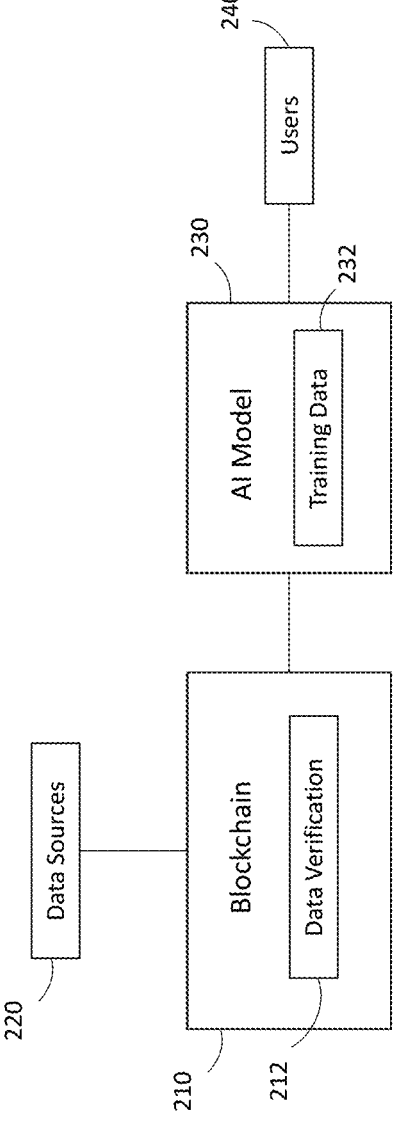
FIG. 2 illustrates an exemplary system workflow 200 using blockchain technology, according to certain aspects of the present disclosure.

FIG. 2 illustrates an exemplary system workflow 200 using blockchain technology for managing copyright risk in AI training, according to certain aspects of the present disclosure. The embodiments described herein are provided by way of example and are not intended to limit the scope of the disclosure. It should be understood that various modifications, substitutions, and alterations can be made to the described embodiments without departing from the scope of the disclosure. For example, while a blockchain implementation is described in FIG. 2, the system workflow 200 may implement other types of secure devices. Further, the system workflow 200 may illustrate and describe a component as performing one or more operations which may be performed by the component or one or more components not illustrated in FIG. 2.

According to embodiments, data D enters the blockchain 210 from one or more data sources 220 and stores the data D on-chain. The data D may be composed of {d0, d1, . . . }. The blockchain 210 may include one or more blockchains or subnets of a blockchain platform. The data D may be used for training one or more AI/ML models. In some embodiments, data D is collected at the blockchain 210 from the data sources 220 (e.g., the internet). In some embodiments, content creators may submit data D directly to the blockchain 210.

According to embodiments, blockchain 210 may perform data verification 212 to confirm that the content creators are the true owners of the data D, authenticating the ownership and the uniqueness of the data D. Based on a determination that the content creators are the true content creators, the content creators are marked as the owner on the blockchain component.

According to embodiments, the blockchain 210 may record details associated with data D. By non-limiting example, the details may include an owner, a type of the data, a date, time, and/or location information associated with the data, copyright information, etc.

AI model 230 may include one or more AI/ML models such as generative AI models, AI software, LLMs, etc. The AI model 230 may request the use of the at least a portion of the data D to be used as training data 232 for training a model M. In some embodiments, the request is recorded in the blockchain and approved. An approval of the request grants models the use of the creator's intellectual property/copyrighted material in exchange for an agreed upon compensation. Based on the approval, AI model 230 uses data D in its training process. In some embodiments, a blockchain transaction is submitted to permit access to the data D. Once the transaction is finalized, the AI model 230 can use the training data 232 including data D. Within the transaction, multiple payment methods may be used.

According to some embodiments, the blockchain 210 may include identifying one or more data sources from the data sources 220 corresponding to the requested data. In some embodiments, the system workflow 200 may include transmitting or notifying the AI model 230 of copyrights associated with the data requested for use in training.

In some embodiments, the data sources 220 and/or the owner of the data D may define specific uses of their data or conditions for data usage. The data verification 212 may include determining if the request (i.e., for using the data to train a model) is in compliance with the defined specific use cases or conditions set by the data source 220/owner. In some embodiments, this compliance check is performed through a smart contract where owners must approve access to the data before it is provided to AI model 230 for training.

According to embodiments, metadata of the data D is updated in the blockchain 210 to record the usage of the data {d0, d1, . . . } in training the model M. In some embodiments, the record can be in the form of a token, a smart contract design, or the like.

In some implementations, payment to the respective owners of the data (e.g., data sources 220) for an initial training of AI model 230 is triggered and finalized on the blockchain 210 based on the use of data D in training data 232. Each owner in data sources 220 is associated with an address used to receive payment from AI model 230 and compensate the owner for usage their data D for training. In some implementations, AI model 230 may process the payment to the respective owners of the data prior to gaining access to the data D. That is, the AI model 230 pays up front for the use of the training data and blockchain 210 permits access once the payment is finalized on-chain. The payments may be distributed to the owners of data D directly or via the data sources 220. In some implementations, records in the blockchain 210 are updated to track and record the payment including, but not limited to, a status of the payment, payment source, payment destination, etc.

User 240 may submit a query Q to AI model 230 along with payment P to use or leverage the trained model M. Each model of the AI model 230 is associated with an address used to receive payment from its users and compensate the owner (in data source 220) of its training data 232. The model M provides the user 240 with a response R by using data D', a subset of data D. AI model 230 may submit a transaction to the blockchain 210 recording use of the data D' in generating the response R to the user's query Q. In some embodiments, the transaction triggers residual payments from an account associated with model M to each owner of the data in data D'. According to aspects, the AI model 230 may ensure that a payment is completed prior to providing the response R to the user 240.

Accordingly, the blockchain 210 has a complete record which may include the request for data to train model M, the data {d0, d1, . . . } used for training model M, and payment transactions for using the data {d0, d1, . . . } in training model M. Blockchain 210 may also track payment transactions for compensating data sources for usage of the trained model M in producing an output (e.g., the response to a query). For example, blockchain 210 tracks the use of data D' by the model M. When data is used to generate the response R to query Q, the AI model 230 submits payments to the owners of that data D', which are finalized on-chain.

Figure 3:
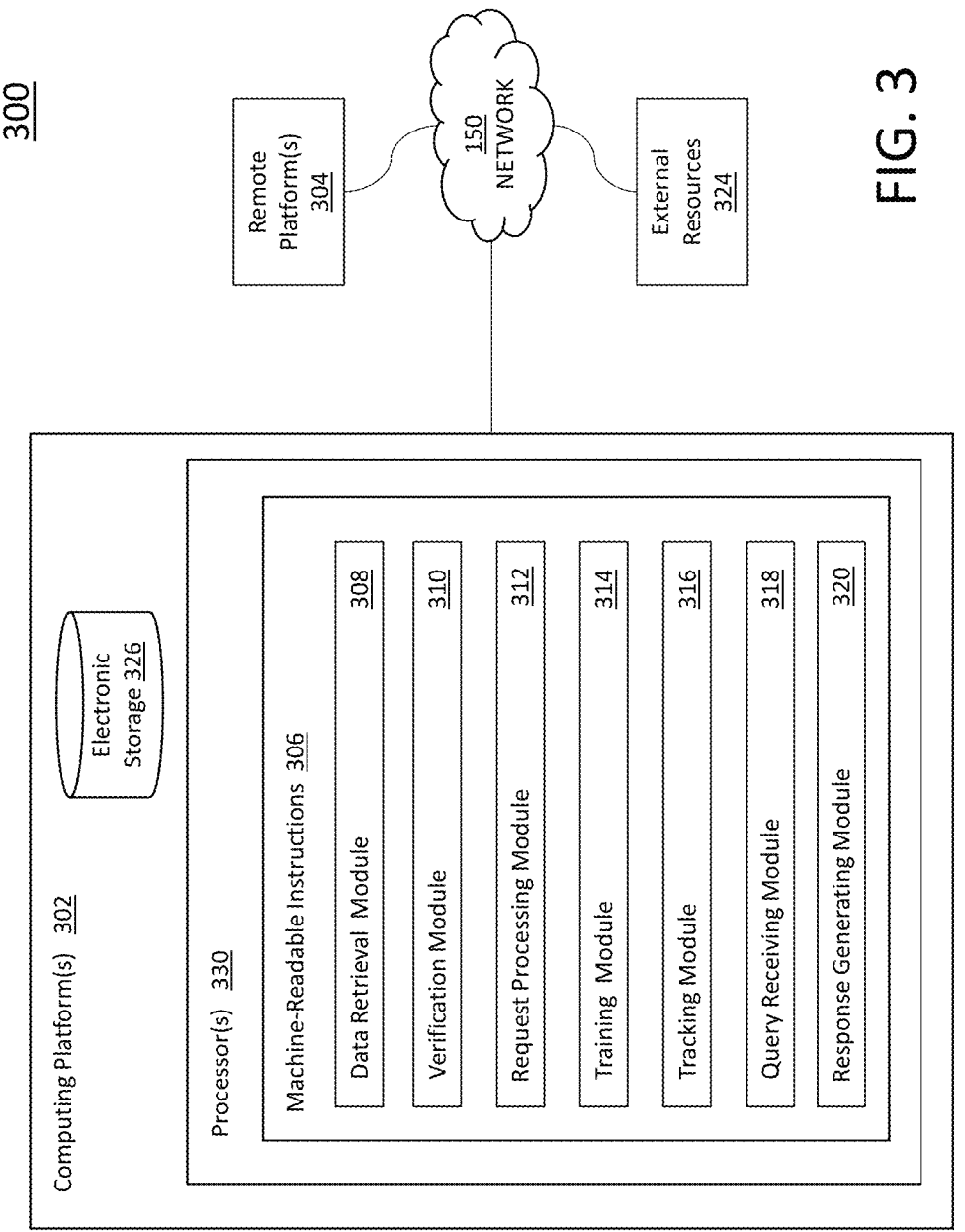
FIG. 3 is a block diagram illustrating an example computer system, according to certain aspects of the present disclosure.

FIG. 3 is a block diagram illustrating an example computer system 300 with which aspects of the subject technology can be implemented. The system 300 can be or include a blockchain platform for managing blockchains, each of which may be a linear chain of blocks such that each block has a parent block. In some implementations, the system 300 may include one or more computing platforms 302. The computing platform(s) 302 can correspond to a server component of the blockchain platform, which can be similar to or the same as the computing device(s) of servers 130 of FIG. 1 and include the client device 110 of FIG. 1.

Computing platform(s) 302 can be configured to track and validate authentic data and the use of the data in training models as well as any resulting outputs based on the trained models. The computing platform(s) 302 may maintain transactions recording data and payments associated with the usage of the data (e.g., for training or generating outputs). The computing platform(s) 302 may be configured to communicate with one or more remote platforms 304 according to a client/server architecture, a peer-to-peer architecture, and/or other architectures. The remote platform(s) 304 may be configured to communicate with other remote platforms via computing platform(s) 302 and/or according to a client/server architecture, a peer-to-peer architecture, and/or other architectures. The remote platform(s) 304 can be configured to cause output of the system 300 on client device(s) of the remote platform(s) 304 with enabled access (e.g., based on analysis by the computing platform(s) 302) according to stored data. As an example, the remote platform(s) 304 may be associated with a query-based application and the application may be used for outputting a response to the queries at a client device. The computing platform(s) 302, external resources 324, and remote platform(s) 304 may be in communication and/or mutually accessible via the network 150.

The computing platform(s) 302 may be configured by machine-readable instructions 306. The machine-readable instructions 306 may be executed by the computing platform(s) to implement one or more instruction modules. The instruction modules may include computer program modules. The instruction modules being implemented may include one or more of data retrieval module 308, verification module 310, request processing module 312, training module 314, tracking module 316, query receiving module 318, response generating 320 and/or other instruction modules.

Data retrieval module 308 is configured to retrieve training data from one or more data sources. The training data comprises copyrighted data, material, content, images, videos, etc. The training data may include any data that may be used for training an AI/ML model. By non-limiting example, this may include media content, images, video data, audio data, text, etc. In some embodiments, the data is scrapped and collected from open sources such as the internet or external/third-party platforms. In some embodiments, the data retrieval module 308 is configured to receive training data directly from data sources. By non-limiting example, a data source may be an owner or creator of the data. The data retrieval module 308 may ingest the data and store it in a secure environment. In some implementations, the data is stored in on-chain and includes metadata associated with each data point including but not limited to, ownership, data type, timestamp, associated transactions, etc. In some implementations, the data is stored in a secure processor (e.g., CPU) comprising enhanced protection for sensitive code and data.

Verification module 310 is configured to perform a verification process to determine authenticity of the training data. This verification process ensures that data sources are the true owners or content creators of the training data that is provided or otherwise retrieved by the data retrieval module 308. The verification module 310 may mark data sources determined to be authentic as the owners on-chain. As described, the ownership may be included as metadata when the data is stored on the blockchain or another secure component.

Request processing module 312 is configured to receive a request from one or more AI models for the use of at least a portion of the training data to train the models. In some embodiments, the request may specify a subset of the training data. The request processing module 312 may be configured to approve or deny the request based on data usage conditions preset by the owners or data sources of the training data. Approval of a request permits the use of the training data by the AI models.

According to some embodiments, the request processing module 312 may be further configured to perform a compliance check to determine if the request is in compliance with the data usage conditions. According to some embodiments, the compliance check is performed through smart contracts where owners are required to approve access to the data prior to it being provided to the AI models for training.

In some embodiments, a blockchain transaction is submitted to permit access to the data for training. Once the transaction is finalized, the AI models can use the data for training.

Training module 314 is configured, based on an approval from the request processing module 312, to train the AI models using the training data.

Tracking module 316 is configured to track and maintain a record of the use of the training data in training the AI models. In some embodiments, the tracking model 316 tracks the request made by the AI models and decisions for those requests (e.g., request approved or denied). Tracking the request may include metadata indicating which data is being requested for access in training. The tracking module 316 may update the metadata associated with the training data to record the usage of the training data in training the models. In some embodiments, the record can be in the form of a token or a smart contract.

According to some embodiments, the tracking module 316 is further configured to process a payment to respective data sources for the use of their data in training the AI models. The payment may be recorded, using the tracking module 316, as a transaction on-chain. In some implementations, the AI models may pay up front for the use of the training data. When the transaction is complete, the AI models are permitted access.

Query receiving module 318 is configured to receive a query for the trained AI models. The query may be submitted by a user and may include a payment for using or leveraging the trained AI models to generate a response.

Response generating module 320 is configured to generate a response to the query using the trained model based on at least a subset of the trained data. In some embodiments, generating the response triggers residual payments from an account associated with the AI models to each owner of the subset of training data used to generate the response. The tracking module 316 may be configured to record the transaction as well as metadata indicating the subset of data used in generating the response. According to some embodiments, the tracking module 316 is configured to ensure that the payment is completed prior to providing the response to the query (e.g., to the user or user interface).

In some implementations, the computing platform(s) 302, the remote platform(s) 304, and/or the external resources 324 may be operatively linked via one or more electronic communication links. For example, such electronic communication links may be established, at least in part, via the network 150 such as the Internet and/or other networks. It will be appreciated that this is not intended to be limiting, and that the scope of this disclosure includes implementations in which the computing platform(s) 302, the remote platform(s) 304, and/or the external resources 324 may be operatively linked via some other communication media.

A given remote platform 304 may include client computing devices, which may each include one or more processors configured to execute computer program modules. The computer program modules may be configured to enable an expert or user associated with the given remote platform 304 to interface with the system 300 and/or external resources 324, and/or provide other functionality attributed herein to remote platform(s) 304. By way of non-limiting example, a given remote platform 304 and/or a given computing platform 302 may include one or more of a server, a desktop computer, a laptop computer, a handheld computer, a tablet computing platform, a NetBook, a Smartphone, a gaming console, and/or other computing platforms. The external resources 324 may include sources of information outside of the system 300, external entities participating with the system 300, and/or other resources. For example, the external resources 324 may include externally designed blockchain elements and/or applications designed by third parties. In some implementations, some or all of the functionality attributed herein to the external resources 324 may be provided by resources included in system 300.

Computing platform(s) 302 may include the electronic storage 326, a processor such as the processors 330, and/or other components. The computing platform(s) 302 may include communication lines, or ports to enable the exchange of information with a network and/or other computing platforms. Illustration of the computing platform(s) 302 in FIG. 3 is not intended to be limiting. The computing platform(s) 302 may include a plurality of hardware, software, and/or firmware components operating together to provide the functionality attributed herein to the computing platform(s) 302. For example, the computing platform(s)

302 may be implemented by a cloud of computing platforms operating together as the computing platform(s) 302.

Electronic storage 326 may include non-transitory storage media that electronically stores information. The electronic storage media of the electronic storage 326 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 326 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 326 may include one or more virtual storage resources (e.g., cloud storage, a virtual private network, and/or other virtual storage resources). Electronic storage 326 may store software algorithms, information determined by the processors 330, information received from computing platform(s) 302, information received from the remote platform(s) 304, and/or other information that enables the computing platform(s) 302 to function as described herein.

Processor(s) 330 may be configured to provide information processing capabilities in computing platform(s) 302. As such, processor(s) 330 may include one or more of an optimized secure hardware component, a digital processor, an analog processor, a digital circuit designed to process information, an analog circuit designed to process information, a state machine, and/or other mechanisms for electronically processing information. Although processor(s) 330 is shown in FIG. 3 as a single entity, this is for illustrative purposes only. In some implementations, processor(s) 330 may include a plurality of processing units. These processing units may be physically located within the same device, or processor(s) 330 may represent processing functionality of a plurality of devices operating in coordination. Processor(s) 330 may be configured to execute modules 308, 310, 312, 314, 316, 318, and/or 320, and/or other modules. Processor(s) 330 may be configured to execute modules 308, 310, 312, 314, 316, 318, and/or 320, and/or other modules by software; hardware; firmware; some combination of software, hardware, and/or firmware; and/or other mechanisms for configuring processing capabilities on processor(s) 330. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, and/or 320 are illustrated in FIG. 3 as being implemented within a single processing unit, in implementations in which processor(s) 330 includes multiple processing units, one or more of modules 308, 310, 312, 314, 316, 318, and/or 320 may be implemented remotely from the other modules. The description of the functionality provided by the different modules 308, 310, 312, 314, 316, 318, and/or 320 described below is for illustrative purposes, and is not intended to be limiting, as any of modules 308, 310, 312, 314, 316, 318, and/or 320 may provide more or less functionality than is described. For example, one or more of modules 308, 310, 312, 314, 316, 318, and/or 320 may be eliminated, and some or all of its functionality may be provided by other ones of modules 308, 310, 312, 314, 316, 318, and/or 320. As another example, processor(s) 330 may be configured to execute one or more additional modules that may perform some or all of the functionality attributed below to one of modules 308, 310, 312, 314, 316, 318, and/or 320.

The techniques described herein (for example, process 400) may be implemented as method(s) that are performed by physical computing device(s); as one or more non-transitory computer-readable storage media storing instructions which, when executed by computing device(s), cause performance of the method(s); or as physical computing device(s) that are specially configured with a combination of hardware and software that causes performance of the method(s).

FIG. 4 illustrates an example flow diagram (e.g., process 400) for managing copyright risk in AI training, according to certain aspects of the disclosure. For explanatory purposes, the steps of the example process 400 are described herein as occurring in serial, or linearly. However, multiple instances of the example process 400 may occur in parallel, overlapping in time, almost simultaneously, or in a different order from the order illustrated in the process 400. In addition, the blocks of the example process 400 need not be performed in the order shown and/or one or more of the blocks of the example process 400 need not be performed.

At step 402, the process 400 may include receiving training data from one or more data sources. The training data includes copyrighted information. In some embodiments, the training data is received from the data sources at a blockchain. In some implementations, owners of data or content creators may input the training data. In some implementations, the process 400 includes collects the training data from the one or more data sources. The data sources include, but are not limited to, internet, public/private databases, etc.

At step 404, the process 400 includes verifying ownership of the training data to ensure the authenticity of the owners/content creators corresponding to the training data. In some embodiments, the training data is associated with metadata indicating ownership, a type of data, a date, a time, a location associated with the training data, and/or copyright information. One or more of the metadata may be modified during the process 400.

At step 406, the process 400 includes storing the training data in a secure computing environment on a secure hardware based on the data sources being verified as the true owners of the training data. According to some embodiments, the secure computing environment is a blockchain network and the training data is stored on-chain.

At step 408, the process 400 includes receiving a request for training one or more models using the training data. In some embodiments, the process 400 includes generating a payment request to be fulfilled before enabling the models to use the training data.

At step 410, the process 400 includes training the models using the training data based on an approval of the request. In some embodiments, the process 400 includes granting access to the training data based on the approval. The training may be performed in the secure computing environment. The secure computing environment may be built on a secure hardware. According to embodiments, the process 400 may include analyzing the request based on a set of usage conditions. The set of usage conditions may be defined by owners of the training data. According to embodiments, the process 400 may include approving the request, based on the set of usage conditions, via smart contracts, wherein the owners approve access of the training data to the models. According to embodiments, the process 400 may include approving the request, based on a set of rules defined by the blockchain network.

According to some embodiments, the process 400 may include updating metadata of the training data in the secure hardware to record the usage of the training data in training the models. In some implementations, the metadata of the training data is updated in the blockchain to record the usage of the training data in training the models. The record may be in the form of a token or a smart contract of the blockchain.

At step 412, the process 400 includes submitting or recording a first transaction on the secure hardware. The first transaction generates an immutable record of the training of the models using the training data. In some embodiments, the first transaction is submitted to the blockchain and serves as a record for the training data usage in training the models on the blockchain.

According to some embodiments, submitting the first transaction on the blockchain permits access of the training data to the models. Training of the models using the training data (i.e., step 410) is then performed based on a completion of the first transaction. Transaction completion may be indicative of a payment from the models to an address of the data sources/owners being finalized on the blockchain. In some implementations, owners of the training data are associated with an address on the blockchain, and payments are made to the address for every use of the training data. The transactions maintain a record of the usage as well as the payment, payment source, payment destination, etc., associated with the usage.

According to some embodiments, the process 400 includes generating a certificate, at the secure hardware, indicating a back propagation used in the training of the models. The certificate may certify that at least a set of training inputs corresponding to the training data be used for training the models, the secure computing environment for the training, and a configuration of the computing environment. According to some embodiments, the process 400 includes transferring records of the set of training inputs and the trained model from the secure hardware performing the training of the model to a graphics processing unit. The graphics processing unit may be configured to generate the certificate, offloading at least some of the processing burden.

At step 414, the process 400 includes receiving a query from a user. The query may be submitted by the user to the trained models or at least one of the trained models (i.e., from step 410).

At step 416, the process 400 includes generating a response to the query using the trained models based on at least a subset of the training data.

At step 418, the process 400 includes submitting or recording a second transaction on the secure hardware. In some embodiments, the models submit the second transaction recording its use of the subset of the training data in generating the response. In some embodiments, the second transaction is submitted to the blockchain and serves as an immutable record for leveraging the subset of the training data to generate the response to the query.

At step 420, the process 400 includes providing the response to the user based on a completion of the second transaction. According to some embodiments, submitting the second transaction to the blockchain triggers residual payments from an account associated with the models to an account associated with each owner corresponding to the subset of the training data used in generating the response. The accounts for the models and owners are associated with corresponding addresses on a blockchain. Completion of the second transaction is indicative of the payment being processed. The user may then gain access to the response. Every use of the trained models (e.g., the matrix) may initiate a transaction to compensate the owners of the data used based on the address.

In some implementations, one or more operation blocks of FIG. 4 may be performed by a processor circuit executing instructions stored in a memory circuit, in a client device, a remote server or a database, communicatively coupled through a network (e.g., processors 330, client devices 110, servers 130, database(s) 152, and network 150).

Although FIG. 4 shows example blocks of the process 400, in some implementations, the process 400 may include additional blocks, fewer blocks, different blocks, or differently arranged blocks than those depicted in FIG. 4.

Hardware Overview

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

The computer system 500 (e.g., server and/or participant) includes a bus 508 or other communication mechanism for communicating information, and a processor 502 coupled with the bus 508 for processing information. By way of example, the computer system 500 may be implemented with one or more processors 502. Each of the one or more processors 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

The computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. Processor 502 and memory 504 can be supplemented by, or incorporated in, special purpose logic circuitry.

The instructions may be stored in memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by the processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

The computer system 500 further includes a data storage device 506 such as a magnetic disk or optical disk, coupled to bus 508 for storing information and instructions. The computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described systems can be implemented using a computer system 500 in response to the processor 502 executing one or more sequences of one or more instructions contained in the memory 504. Such instructions may be read into memory 504 from another machine-readable medium, such as data storage device 506. Execution of the sequences of instructions contained in the main memory 504 causes the processor 502 to perform the process steps described herein. One or more processors in a multi-processing arrangement may also be employed to execute the sequences of instructions contained in the memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

The computer system 500 can include clients and servers. A client and server are generally remote from each other and typically interact through a communication network. The relationship of client and server arises by virtue of computer programs running on the respective computers and having a client-server relationship to each other. The computer system 500 can be, for example, and without limitation, a desktop computer, laptop computer, or tablet computer. The computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to the processor 502 for execution. Such a medium may take many forms, including, but not limited to, non-volatile media, volatile media, and transmission media. Non-volatile media include, for example, optical or magnetic disks, such as the data storage device 506. Volatile media include dynamic memory, such as the memory 504. Transmission media include coaxial cables, copper wire, and fiber optics, including the wires that comprise the bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

What is claimed is:

1. A computer-implemented method for verifying provenance of trained artificial intelligence models, the method comprising:

receiving, at a distributed ledger, training data from one or more data sources;

issuing, at a secure hardware processor executing a set of instruction codes, a request to train one or more models using the training data;

receiving, from owners of the training data, approval of the request via a smart contract;

executing a first transaction on the distributed ledger compensating owners of the training data for providing their data for the training of the one or more models, the first transaction serving as record on the distributed ledger of data inputs used to generate one or more trained models and granting access to the training data upon completion of a payment transaction to distributed ledger addresses of the owners;

training, at the secure hardware processor, the one or more models using the training data in response to the approval for access to the training data;

generating, by the secure hardware processor, a cryptographic certificate by executing, at the secure hardware processor, back propagation for training the one or more models, the cryptographic certificate attesting that a back propagation routine was executed within a trusted execution environment of the secure hardware processor and binds (i) a set of training inputs corresponding to the training data used to train the one or more models, (ii) parameters of the one or more models resulting from the training, and (iii) an identifier and configuration of the secure hardware processor;

generating, using the trained one or more models, a response to a query from a user based on at least a subset of the training data;

executing a second transaction on the distributed ledger compensating owners of the subset of the training data for leveraging their data to generate the response to the query;

verifying, using the cryptographic certificate, that the response was generated by a model trained within the trusted execution environment and without use of unapproved or unverified datasets; and tracking, via the distributed ledger, each use of the training data and each inference generated using the one or more models including model updates and/or query response generation.

2. The computer-implemented method of claim 1, wherein the training data is associated with metadata indicating ownership, a type of data, a date, a time, a location associated with the training data, and/or copyright information.

3. The computer-implemented method of claim 1, further comprising:

verifying ownership of the training data prior to inclusion in an AI training dataset;

preventing access to the data until ownership is verified and usage conditions are satisfied; and storing the training data on the distributed ledger based on the data sources being verified as owners of the training data.

4. The computer-implemented method of claim 1, further comprising:

receiving a request for training the models using the training data;

approving the request, based on a set of usage conditions, via smart contracts, wherein the set of usage conditions are defined by owners of the training data and the owners approve access to the training data; and training the models using the training data based on an approval of the request.

5. The computer-implemented method of claim 1, further comprising updating metadata of the training data in the distributed ledger to record usage of the training data in training the models, wherein the record is in the form of a token or a smart contract in the distributed ledger.

6. The computer-implemented method of claim 1, wherein:

submitting the first transaction to the distributed ledger permits access of the training data to the models; and training the models using the training data is performed based on a completion of the first transaction.

7. The computer-implemented method of claim 1, further comprising: receiving the query from the user; and providing the response to the user based on a completion of the second transaction, wherein submitting the second transaction to the distributed ledger triggers residual payments from an account associated with the models to each owner corresponding to the subset of the training data.

8. The computer-implemented method of claim 1, wherein owners of the training data are associated with an address on the distributed ledger, and payments are made to the address for every use of the training data.

9. The computer-implemented method of claim 1, comprising recording the cryptographic certificate on the distributed ledger to provide an immutable association between a training process and corresponding data access and usage transactions, and wherein the cryptographic certificate serves as an immutable proof of provenance verifying that trained models were generated by the secure hardware processor using the set of training inputs.

10. The computer-implemented method of claim 9, further comprising transferring records of a set of training inputs and a trained model from a secure hardware performing the training of the models to a graphics processing unit, wherein the trusted execution environment is built into the secure hardware.

11. The computer-implemented method of claim 9, wherein a graphics processing unit is configured to generate the certificate.

12. A system for verifying provenance of trained artificial intelligence models, comprising:

a secure hardware processor; and a memory comprising instructions stored thereon, which when executed by the one or more processors, causes the one or more processors to perform:

receiving, at a distributed ledger, training data from one or more data sources;

issuing a request to train one or more models using the training data;

receiving, from owners of the training data, approval of the request via a smart contract;

executing a first transaction on the distributed ledger compensating owners of the training data for providing their data for the training of the one or more models, the first transaction serving as record on the distributed ledger of data inputs used to generate one or more trained models and granting access to the training data upon completion of a payment transaction to distributed ledger addresses of the owners;

training the one or more models using the training data in response to the approval for access to the training data;

generating a cryptographic certificate by executing back propagation for training the one or more models, the cryptographic certificate attesting that a back propagation routine was executed within a trusted execution environment of the secure hardware processor and binds (i) a set of training inputs corresponding to the training data used to train the one or more models, (ii) parameters of the one or more models resulting from the training, and (iii) an identifier and configuration of the secure hardware processor;

generating, using the trained one or more models, a response to a query from a user based on at least a subset of the training data;

executing a second transaction on the distributed ledger compensating owners of the subset of the training data for leveraging their data to generate the response to the query;

verifying, using the cryptographic certificate, that the response was generated by a model trained within the trusted execution environment and without use of unapproved or unverified datasets; and tracking, via the distributed ledger, each use of the training data and each inference generated using the one or more models including model updates and/or query response generation.

13. The system of claim 12, wherein the training data is associated with metadata indicating ownership, a type of data, a date, a time, a location associated with the training data, and/or copyright information.

14. The system of claim 12, wherein the instructions, when executed by the one or more processors, cause the one or more processors to perform:

verifying ownership of the training data prior to inclusion in an AI training dataset;

preventing access to the data until ownership is verified and usage conditions are satisfied; and storing the training data on the distributed ledger based on the data sources being verified as owners of the training data.

15. The system of claim 12, wherein the instructions, when executed by the one or more processors, cause the one or more processors to perform:

receiving a request for training the models using the training data;

approving the request, based on a set of usage conditions, via smart contracts, wherein the set of usage conditions are defined by owners of the training data and the owners approve access to the training data; and training the models using the training data based on an approval of the request.

16. The system of claim 12, wherein the instructions, when executed by the one or more processors, cause the one or more processors to perform updating metadata of the training data in the distributed ledger to record usage of the training data in training the models, wherein the record is in the form of a token or a smart contract in the distributed ledger.

17. The system of claim 12, wherein the instructions, when executed by the one or more processors, cause the one or more processors to perform:

submitting the first transaction to the distributed ledger permits access of the training data to the models; and training the models using the training data is performed based on a completion of the first transaction.

18. The system of claim 12, wherein the instructions, when executed by the one or more processors, cause the one or more processors to perform:

receiving the query from the user; and providing the response to the user based on a completion of the second transaction, wherein submitting the second transaction to the distributed ledger triggers residual payments from an account associated with the models to each owner corresponding to the subset of the training data.

19. The system of claim 12, wherein the instructions, when executed by the one or more processors, cause the one or more processors to perform:

recording the cryptographic certificate on the distributed ledger to provide an immutable association between a training process and corresponding data access and usage transactions, and wherein the cryptographic certificate serves as an immutable proof of provenance verifying that trained models were generated by the secure hardware processor using the set of training inputs.

20. A non-transitory computer-readable storage medium comprising instructions stored thereon, which when executed by one or more processors, cause the one or more processors to perform operations for verifying provenance of trained artificial intelligence models, comprising:

receiving, at a distributed ledger, training data from one or more data sources;

issuing, at a secure hardware processor executing a set of instruction codes, a request to train one or more models using the training data;

receiving, from owners of the training data, approval of the request via a smart contract;

executing a first transaction on the distributed ledger compensating owners of the training data for providing their data for the training of the one or more models, the first transaction serving as record on the distributed ledger of data inputs used to generate one or more trained models and granting access to the training data upon completion of a payment transaction to distributed ledger addresses of the owners;

training, at the secure hardware processor, the one or more models using the training data based on the approval for access to the training data;

generating, by the secure hardware processor, a cryptographic certificate by executing, at the secure hardware processor, back propagation for training the one or more models, the cryptographic certificate attesting that a back propagation routine was executed within a trusted execution environment of the secure hardware processor and binds (i) a set of training inputs corresponding to the training data used to train the one or more models, (ii) parameters of the one or more models resulting from the training, and (iii) an identifier and configuration of the secure hardware processor;

generating, using the trained one or more models, a response to a query from a user based on at least a subset of the training data;

executing a second transaction on the distributed ledger compensating owners of the subset of the training data for leveraging their data to generate the response to the query;

verifying, using the cryptographic certificate, that the response was generated by a model trained within the trusted execution environment and without use of unapproved or unverified datasets;

providing the response to the user based on a completion of the second transaction, wherein submitting the second transaction to the distributed ledger triggers residual payments from an account associated with the models to each owner corresponding to the subset of the training data; and tracking, via the distributed ledger, each use of the training data and each inference generated using the one or more models including model updates and/or query response generation.

21. The computer-implemented method of claim 1, further comprising:

generating an immutable certification based on at least a portion of the training data used to train the models, the immutable certification indicating the processor used to train the models using a portion of the training data.

\* \* \* \* \*